United States Patent [19]

Choate

[11] Patent Number: 5,619,031
[45] Date of Patent: Apr. 8, 1997

[54] VARIABLE MAGNIFICATION APPARATUS FOR RETICLE PROJECTION SYSTEM

[75] Inventor: Albert G. Choate, Rush, N.Y.

[73] Assignee: Optical Gaging Products, Inc., Rochester, N.Y.

[21] Appl. No.: 558,793

[22] Filed: Nov. 15, 1995

[51] Int. Cl.⁶ .................................................. G02B 7/04
[52] U.S. Cl. ...................... 250/201.2; 359/363; 348/136
[58] Field of Search ........................ 250/559.38, 559.22, 250/559.19, 559.08, 559.29, 201.2, 201.7; 359/363; 348/136, 137, 94, 95, 87

[56] References Cited

U.S. PATENT DOCUMENTS

| | | | |
|---|---|---|---|
| 4,639,587 | 1/1987 | Chadwick et al. | 250/201 |
| 4,920,273 | 4/1990 | Sacks et al. | 250/560 |
| 5,389,774 | 2/1995 | Gelman et al. | 250/201.1 |

Primary Examiner—Edward P. Westin
Assistant Examiner—Alan L. Giles
Attorney, Agent, or Firm—Shlesinger, Fitzsimmons & Shlesinger

[57] ABSTRACT

A magnifying lens system is fixed to the lower end of a vertically adjustable support plate to overlie a workpiece, and to project an image thereof upwardly through a beamsplitter to the image sensor of a video camera that is mounted for vertical adjustment on the support plate above the lens system. A portion of the lens system registers with the reflective surface of a mirror which is inclined to the horizontal, and which registers also with the output of a reticle projecting mechanism that is operatively connected to the video camera for vertical adjustment therewith on the support plate. During auto-focusing, an image of a reticle contained in the reticle projecting mechanism is projected via the mirror, the lens system and the beamsplitter onto the surface of the workpiece. Since the reticle projecting mechanism is coupled to the camera, magnification of the images of the workpiece surface and the reticle will occur simultaneously.

13 Claims, 2 Drawing Sheets

VARIABLE MAGNIFICATION APPARATUS FOR RETICLE PROJECTION SYSTEM

BACKGROUND OF THE INVENTION

This invention relates to inspection apparatus, and more particularly to metrological apparatus having a reticle projection system for determining precise dimensional measurements of manufactured objects. Even more particularly, this invention relates to variable magnification apparatus for providing a variable range of magnifications for a reticle projection system of the type described.

There are currently available in the marketplace a number of sophisticated metrological optical systems employed for purposes of quality control, and to determine the precise dimension of manufactured objects. Typically the machines incorporating such systems employ a magnification lens system for projecting the image of an object that is being inspected to a video camera for computerized detection of Features of the object in, for example, a horizontal plane— i.e. the XY plane. In addition, such machines also normally incorporate so-called autofocusing equipment which is utilized to determine the vertical distance (Z) to a spot on the surface of the object that is being inspected. The determination of the range or Z distance from a reference point to a spot on the object that is being inspected, can be computed by monitoring the sharpness of the image to an object that is being scanned through the best focus. This method of determining the Z distance depends upon the computational method used, the optical characteristics of the imaging system, the method of illumination of the object that is being inspected, and the characteristics of the object surfaces and Features.

Among the problems encountered in autofocusing methods of the type described, is that in those cases where the inspected object has a particularly smooth or transparent surface, the observed image of the surface has very little texture or contrast, which therefore makes it extremely difficult accurately to measure the Z distance to a particular point on the surface. In such cases it had been customary to project an image of a reticle or grid pattern to the object plane of the image, and the image of the pattern can then be observed when a real object surface is in position to reflect that pattern or grid. One such method of autofocusing is disclosed in U.S. Pat. No. 4,920,273, and is employed in equipment manufactured by Leitz Mestechnik GmbH, and identified as the Leitz UMS 432, Measuring Station.

The method employed in the two above-noted prior art devices comprises a method of artificial texture projection, which gives more precise results when the depth of focus of the projected grid or pattern is very shallow; and this depth of focus in turn depends upon the F-number of the reticle projector that is employed. More precise results are recognized also when the texture pattern is matched to the magnification employed to observe the object, and matches the focus analysis method employed. The machines disclosed in the above-noted U.S. patents however, do not employ any apparatus which assures the presence of these features in their equipment. Specifically, such prior art apparatus does not employ any means for separately providing the reticle projector with a range of magnifications which can be matched to the various object magnifications which normally are present in metrological apparatus of the type described.

It is an object of this invention, therefore, to provide for a reticle projection system in metrological apparatus of the type described, apparatus for effecting variable magnification of the projected reticle image.

Another object of this invention is to provide for a reticle projection system of the type described, apparatus which permits lower F-number and therefore shallower depth of focus of the projected image of a reticle or grid pattern.

A more specific object of this invention is to provide for a reticle projection system zoom magnification apparatus which is coupled to a video camera for movement therewith toward and away from an object plane to achieve synchronized magnification between the video camera and reticle projector.

Other objects of this invention will be apparent hereinafter from the specification and from the recital of the appended claims, particularly when read in conjunction with the accompanying drawings.

SUMMARY OF THE INVENTION

In one embodiment a first telecentric lens system is fixed to the lower end of a vertically adjustable support plate to overlie a workpiece, and to project an image thereof upwardly through a beamsplitter that is secured to the lower end of the first lens system, and through the adjustable opening in an iris diaphragm to the image sensor of a video camera that is mounted for vertical adjustment on the support plate above the iris diaphragm. A second telecentric lens system, which is secured at one end to one side of the beamsplitter to extend laterally therefrom, has its opposite end spaced from and registering with the reflective surface of a mirror which is inclined to the horizontal, and which registers also with the lower, output end of a reticle projecting mechanism that is operatively connected to the video camera for vertical adjustment therewith on the support plate.

During auto-focusing, an image of a reticle contained in the reticle projecting mechanism is projected downwardly onto the mirror, laterally therefrom through said second lens systems to the beamsplitter, and downwardly onto the surface of the workpiece. .The iris diaphragm is of the type that is adjusted automatically upon adjustment of the video camera on the support plate, and since the reticle projecting mechanism is coupled to the camera, magnification and focus of the adjustment of the reticle projecting mechanism wily occur simultaneously with that of the video camera.

In the second embodiment, an adjustable zoom lens mechanism is interposed between the beamsplitter and the workpiece, the beamsplitter and reticle projecting mechanism being interposed between the video camera and the zoom lens mechanism. In this case the reticle image is projected by the beamsplitter along the Z axis and through the zoom lens mechanism to the workpiece so that both the image of the workpiece and the reticle can have a range of magnifications that are adjustable simultaneously.

THE DRAWINGS

FIG. 1 is a fragmentary front elevational view illustrating schematically in part, and partially in section, metrological apparatus having a reticle projection system and zoom magnification apparatus therefor made according to one embodiment of this invention, FIG. 2 is a fragmentary sectional view taken along the line 2—2 in FIG. 1 looking in the direction of the arrows, but on a slightly smaller scale; and FIG. 3 is a fragmentary front elevational view of a modified form of this apparatus, portions thereof again being illustrated schematically and others partially in section.

DETAILED DESCRIPTION OF THE PREFERRED EMBODIMENTS

Figure 1:
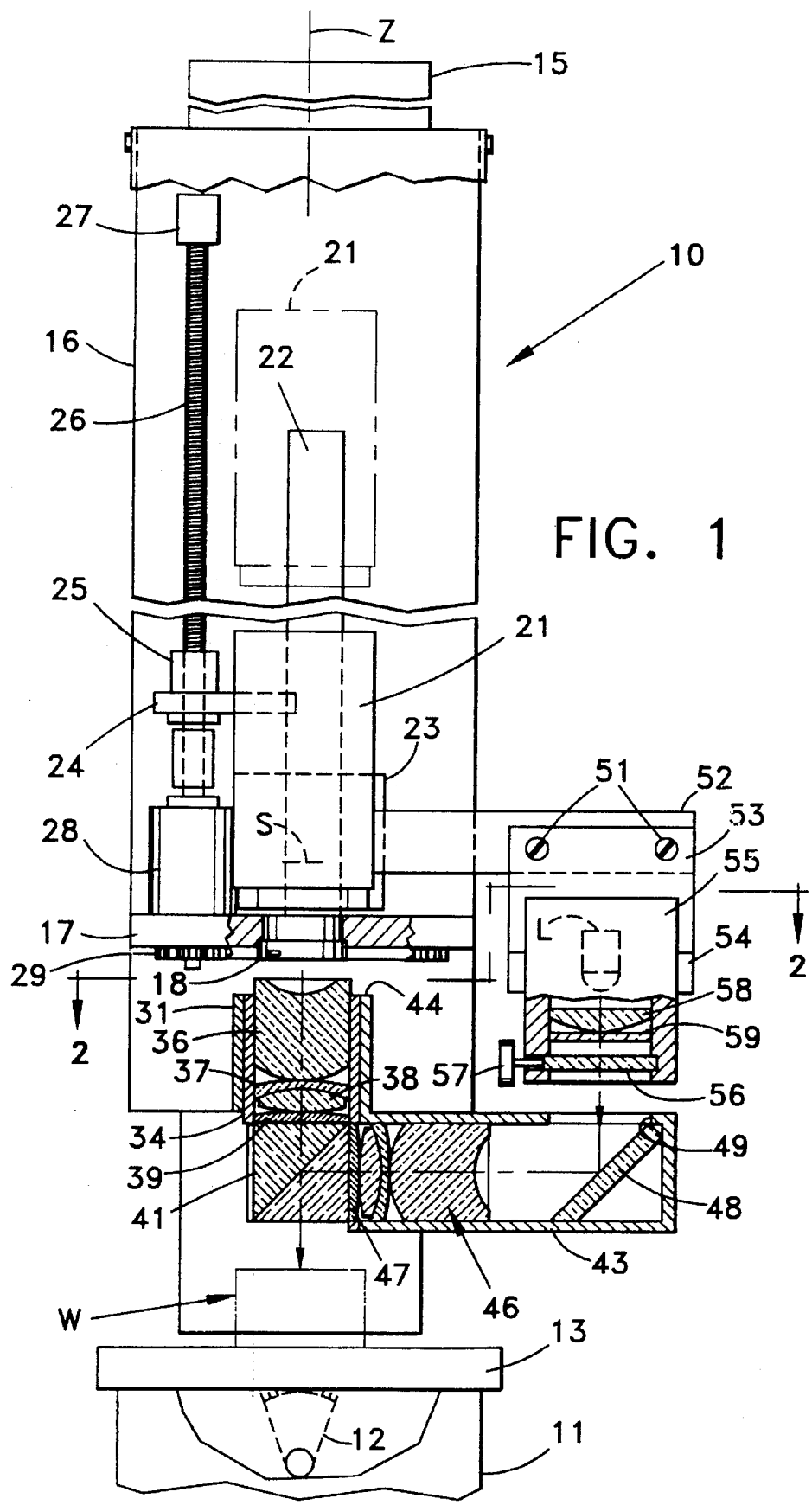
Figure 2:
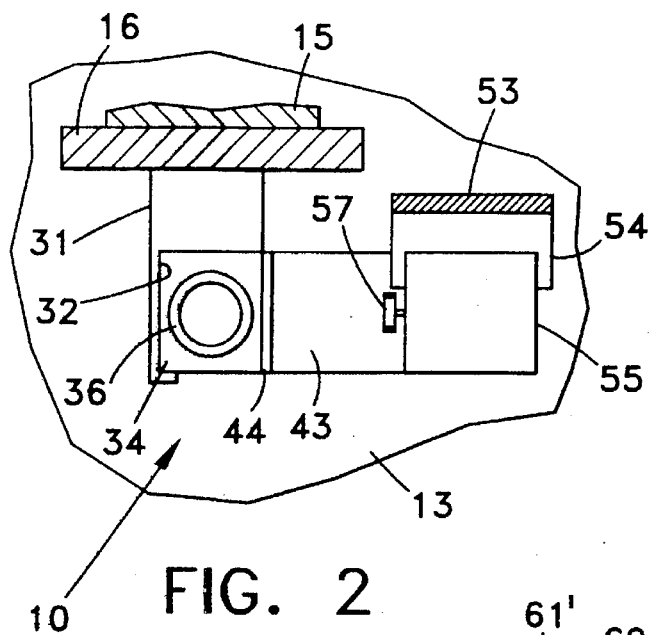

Referring now to the drawings by numerals of reference, and first to FIGS. 1 and 2, 10 denotes generally metrological apparatus having a reticle projection system and zoom magnification apparatus therefor which is operable simultaneously to magnify and to focus both a projected reticle image, and the image of the work that is being inspected. More specifically, this apparatus comprises a table or stand 11 having thereon a work supporting surface 13 beneath which is positioned a light source 12 that can be used for projecting upwardly a contour image of a workpiece W positioned on top of the work surface 13. Mounted for reciprocation on the face of a precision slide 15, which is mounted above surface 13, is a mounting plate 16. Secured to and projecting at right angles from the lower edge of the plate 16, and in vertically spaced, confronting relation to the work surface 13, is an iris diaphragm or stop mounting plate 17. Secured at its upper end in a circular opening in plate 17 is an adjustable iris diaphragm 18. Diaphragm 18 registers coaxially at its upper end with the lower end of a video camera 21, which is mounted for vertical movement, for example between its full line and broken line positions as shown in FIG. 1, on a guide rail 22, which is secured to and extends longitudinally of the face of support plate 16 centrally thereof.

The video camera 21 is secured to the face of a carriage 23 which is mounted in a conventional manner on rail 22 by recirculating ball bearings (not illustrated) for vertical movement on rail 22. Carriage 23 is attached via a bracket 24 to a drive nut 25, which is mounted for vertical travel on a vertically disposed lead screw 26. Screw 26 is coupled at its upper end of the drive shaft of a reversible motor 27, which is mounted on the face of support plate 16 adjacent its upper end; and screw 27 is coupled in a conventional manner at its lower end to the upper end of a speed reducer 28, which is secured on the upper surface of the diaphragm support plate 17. The output shaft of the speed reducer 28 projects downwardly through the plate 17 and has secured thereon a gear 29 which is drivingly connected to the adjustable iris diaphragm by a mechanism of the type disclosed in my co-pending U.S. patent application Ser. No. 08/415,631, which was filed Apr. 3, 1995. The subject matter of my above-noted application is hereby incorporated herein to the extent necessary to understand the manner in which the motor 27 and drive screw 26 are selectively operated simultaneously to shift the carriage 23, and hence the video camera 21 vertically on slide 22, and at the same time to effect rotational adjustment of the iris diaphragm 18 and consequent adjustment of the iris opening therein.

Secured to and projecting from the face of plate 16 beneath plate 17 is a large rectangular block 31 having at its outer end a vertically extending, generally rectangularly-shaped notch 32, which overlies the work supporting surface 13. Secured in the notch 32 in the block 31 is a rectangularly-shaped lens barrel 34 containing a telecentric lens system designed to be focused on the surface of the workpiece W. Cemented in the upper end of the bore in the barrel 34 by a conventional UV curing cement, or the life, is a large magnifying lens 36. Cemented coaxially in the same bore beneath the lens 36 are the lenses 37, 38 and 39, which form a conventional triplet system, and which are of the standard negative-meniscus, double convex and plano-convex configurations, respectively. The plane underside of the lens 39 registers approximately with the bottom of the lens barrel 55, and has cemented thereto a beamsplitter 41, one side of which (the left side in FIG. 1) is covered in a conventional manner by a light absorbing filter.

Another rectangularly-shaped lens barrel 43 has at one end thereof (the left end as shown in FIG. 1) a right angular projection or lug 44, which is fastened to one side of the lens barrel 34 (the right side thereof as shown in FIG. 1) so that the rectangularly-shaped bore in the barrel 43 registers with one side (the right side as shown in FIG. 1) of the beamsplitter 41. At one end thereof (the left end as shown in FIG. 1) the barrel 43 has secured therein a conventional projection lens system which is similar to that secured in the barrel 34, and which is denoted generally by the numeral 46. The lens system 46 includes a plano-convex lens 47 the plane side of which is cemented to the right side of the beamsplitter 41, as shown in FIG. 1. Lens barrel 43 has at its end remote from the beamsplitter 41 a mirror 48 the reflective surface of which lies in a plane inclined approximately 45° to the axis of the bore in the barrel 43, and which registers at its upper end with an opening 49 formed in the upper wall of the barrel 43.

Secured adjacent its upper end by one or more screws 51 (FIG. 2) to the face of one leg 52 of a right angular bracket, the other leg of which is secured to one side of carriage 23 for vertical movement therewith, is a lens barrel supporting plate 53. Integral with and projecting from the lower end of plate 53 is a generally U-shaped bracket 54 between the legs of which is releasably secured a rectangular lens barrel 55, the lower, open end of which registers with the opening 49 in the lens barrel 43. Barrel 55 contains a light source L, which directs illumination downwardly out of the lower end of the barrel 55 and through opening 49 and onto the surface of the mirror 48 in the lens barrel 43.

Removably mounted in barrel 55 adjacent its lower end is a reticle plate 56, which can be inserted into or withdrawn from the barrel 55 via a handle 57. A lens 58 and filter 59, which are mounted in barrel 55 between the light source L and the reticle plate 56, focus illumination onto the reticle plate 56, so that the reticle image that is formed on the plate 56—for example, a series of concentric, radially-spaced rings—can be projected by illumination from the light source L, downwardly onto the reflective surface of mirror 48, and then laterally along the axis of the projection lens assembly 46. The image of the reticle is then projected by the beamsplitter 41 downwardly along the axis Z to the surface of the workpiece W positioned on the stand 11; and the images of the workpiece and the reticle are then reflected verically upwardly through the beamsplitter to the image sensor S in the video camera 21. Sensor S is located approximately ¾" above the lower end of a camera 21.

The advantage of this construction is that upon adjustment of the video camera 21 vertically on the support plate 16 via motor 27, for example in response to instructions from an associated computer control mechanism of conventional design (not illustrated), there will be simultaneous vertical movement of camera 21 and lens barrel 55 relative to the lenses in barrels 34 and 43, and consequent magnification and focus adjustment of both the projected reticle image, and the image of the workpiece W on stand 11. Moreover, whenever the support plate 16 is shifted vertically on the slide 15, the reticle and the light source or illuminator L, which may also be utilized to function as the surface illuminator for the wordpiece W, shift in unison vertically with the camera 21, since they are mounted on the same support 16. If desired, the reticle plate 56 may be withdrawn, or removed to an inoperative position in barrel 55 via its handle 57, so that uniform, normal surface illumination may be directed via the beamsplitter 41 onto the surface of the work W. On the other hand, when autofocusing operations are to be effected, the reticle plate 56 may be inserted into its operative position as shown in FIG. 1. In this position the axial distance from the center of the upper end of lens 36 to the image sensor S in camera 21 is equal to the sum of the axial distances from the center of the mirror 48 to the reticle plate 56 and to the magnifying lens of system 46.

Figure 3:
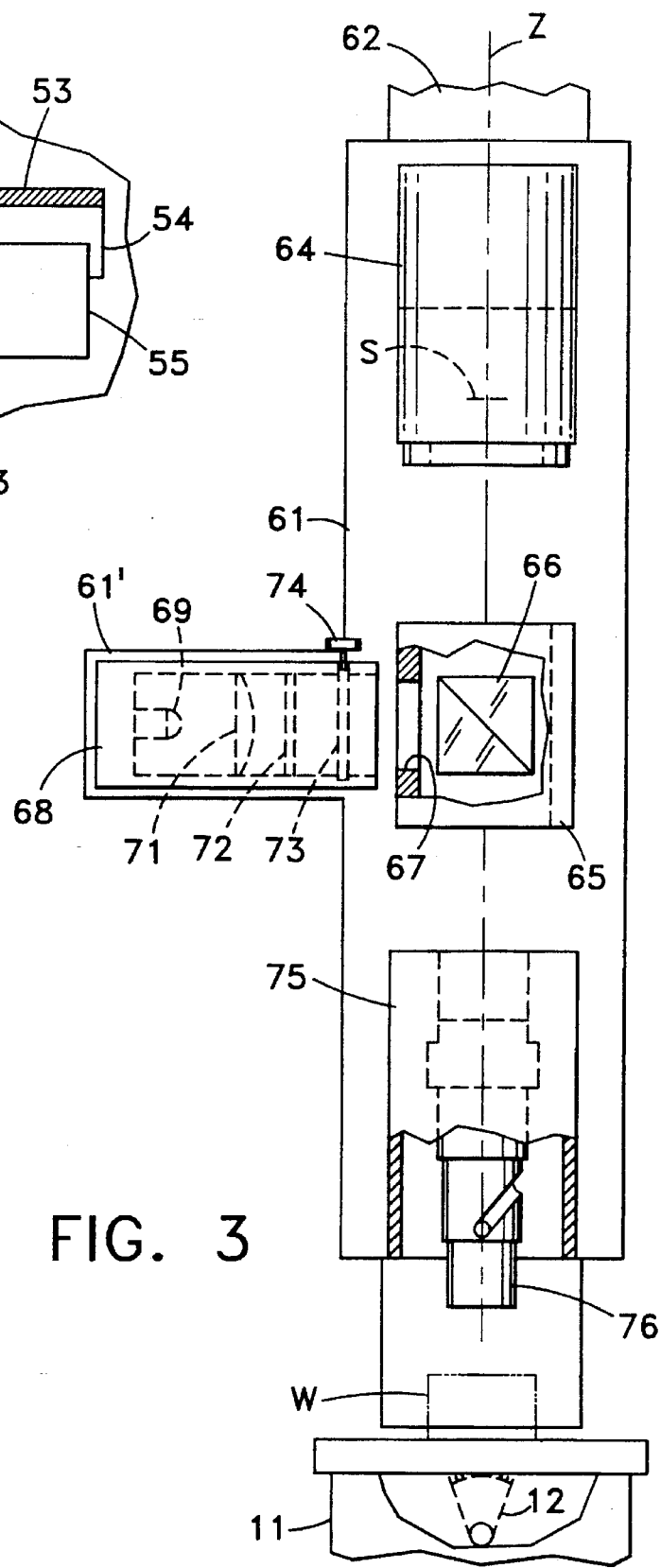

Referring now to the embodiment shown in FIG. 3, support plate 61, which is mounted for vertical movement on a slide 62, has mounted on the face thereof adjacent its upper end a video camera 64, the lower end of which registers coaxially of the vertical axis Z with the upper end of a bore in a lens barrel 65, which is fastened to support 61 below camera 64. Barrel 65 contains a beamsplitter 66 one side of which, the left side as shown in FIG. 3, registers through an opening 67 in the barrel 65 with one end of the bore in another lens barrel 68, which is secured at the face of a lateral projection 61' formed on the support plate 61 intermediate its ends. The contents of the barrel 68 are similar to those of the barrel 55 in the first embodiment, and include a light source 69, a lens 71, a filter 72, and a reticle plate 73 having thereon a handle 74 for removably inserting the plate 73 into and removing it from the barrel 68.

When the light source 69 is illuminated, an image of the reticle on plate 73 is projected through the opening 67 onto the beamsplitter 66, which then projects the reticle image downwardly along axis Z to the upper end of a conventional zoom lens assembly 75 having in the lower end thereof an adjustable objective lens assembly 76, which registers with the upper surface of the workpiece W on the table 11. In this embodiment, therefore, the zoom lens mechanism 75 is interposed between the work W and the beamsplitter 66, while the beamsplitter itself is interposed between the image sensor or detector S in the video camera 64 and the zoom lens mechanism 75. The image on the reticle plate 73, therefore can then be projected by the beamsplitter 66 downwardly through the zoom lens mechanism onto the surface of the workpiece W, so that in turn, both the image of the workpiece and the projected reticle image can then be projected upwardly through the zoom lens mechanism 75 in the beamsplitter 66 to the video camera 64. With this constuction the pattern represented by the projected reticle image can be matched to the image resolution. Again, the light source 69 can be used to both project the image of a reticle pattern onto the workpiece, and at the same time provide surface illumination for the workpiece itself.

From the foregoing it will be apparent that the present invention provides relatively simple and inexpensive means for enabling simultaneous zoom magnification of both the projected images as well as the image of a workpiece as it is being observed. In other words, such apparatus is operable simultaneously to magnify and to focus both the projected reticle image, and the image of the workpiece. In the embodiment of FIGS. 1 and 2 wherein fixed optical elements and the variable camera distance are employed to achieve magnification variation, and it is possible automatically also to adjust the associated iris diaphragm 18 upon vertical movement of plate 16 on slide 15 to effect simultaneous focusing of the reticle image and the work image. In the case of the second embodiment (FIG. 3), the assemly has the additional advantage that the zoom lens assembly 75 can be adjusted independently of the focusing effected by movement of the support plate 61 on the slide 62. In each embodiment the reticle image magnification lens system (46 and 75) is interposed between the reticle projector and the associated beamsplitter.

While this invention has been illustrated and described in detail in connection with only certain embodiments thereof, it will be apparent that it is capable of still further modification, and that this application is intended to cover any such modifications as may fall within the scope of one skilled in the art, or the appended claims.

I claim:

1. In metrological equipment of the type having a video camera, and a reticle projecting system for use in autofocusing an image sensor in the camera on a workpiece that is being inspected, apparatus for effecting variable magnification of the reticle image produced by said system, comprising means mounting said camera for adjustment toward and away from a workpiece, and with the image sensor thereof facing the surface of the workpiece that is to be inspected, optical means including a beamsplitter interposed between said camera and the workpiece, and operative to project an image of said surface of the workpiece to the image sensor of said camera, said reticle projection system including a reticle operatively attached to said camera for movement therewith toward and away from the workpiece, and said system being operable to project an image of said reticle to said optical means for projection thereby onto said surface of the workpiece, said optical means being operative, upon projecting an image of said reticle onto said surface of the workpiece to project the combined images of said surface and said reticle to said image sensor, said optical means including magnification means for effecting variable magnification of said image of said surface of the workpiece, and said image of said reticle, said camera mounting means comprising a support mounted for movement toward and away from said workpiece, and means movably mounting said camera on said support selectively for movement therewith, and for movement relative to said support toward and away from said workpiece, and said optical means being mounted on said support for movement therewith.

2. In metrological equipment as defined in claim 1, wherein said magnification means is operative simultaneously to vary the magnification of said images upon movement of said camera relative to said support.

3. In metrological equipment as defined in claim 2, including an adjustable iris diaphragm mounted on said support between said camera and said optical means and having therein an adjustable stop opening registering coaxially with said beamsplitter and said image sensor, said iris diaphragm being operatively connected to said camera for adjustment therewith upon movement of said camera relative to said support.

4. In metrological equipment as defined in claim 1, wherein said magnification means comprises, a first set of lenses fixed to said support coaxially of the image sensor in said camera, and with one end of said first set facing said image sensor, and with said beamsplitter being positioned over the opposite end of said first set of lenses in confronting relation to the workpiece, and a second set of lenses fixed to said support and engaged at one end thereof with said beamsplitter coaxially of an axis extending at right angles to the axis of said first set of lenses, and confronting at the opposite end thereof upon a mirror, said reticle projecting system being operable to project an image of said reticle to said mirror for reflection thereby into said opposite end of said second set of lenses, and each of said sets of lenses including at least one magnifying lens.

5. In metrological equipment as defined in claim 4, wherein the axial distance from said one end of said first set of lenses to said image sensor is equal to the axial distance from said reticle to said opposite end of said second set of lenses.

6. In metrological equipment as defined in claim 4, wherein said reticle projection system comprises a lens barrel secured to said camera for movement therewith relative to said support, said barrel having therein a bore opening at one end in spaced, confronting relation to said mirror, and having a light source in the opposite end thereof, means removably mounting said reticle in said bore in said barrel adjacent said one end thereof, and a lens system in said bore operative to project an image of said reticle to said mirror.

7. In metrological equipment of the type having a video camera, and a reticle projection system for use in autofocusing an image sensor in the camera on a workpiece that is being inspected, apparatus for effecting variable magnification of the reticle image produced by said system, comprising means mounting said camera for adjustment toward and away from a workpiece, and with the image sensor thereof facing the surface of the workpiece that is to be inspected, optical means including a beamsplitter interposed between said camera and the workpiece, and operative to project an image of said surface of the workpiece to the image sensor of said camera, said reticle projecting system including a reticle operatively attached to said camera for movement therewith toward and away from the workpiece, and said system being operable to project an image of said reticle to said optical means for projection thereby onto said surface of the workpiece, said optical means being operative, upon projecting an image of said reticle onto said surface of the workpiece, to project the combined images of said surface and said reticle to said image sensor, said optical means including magnification means for effecting variable magnification of said image of said surface of the workpiece, and said image of said reticle, said camera mounting means comprising a support movable toward and away from the workpiece, said camera and said magnification means being mounted on said support in spaced, coaxial relation to each other, said reticle projection system and said beamsplitter being mounted on said support between said camera and said magnification means, and said magnification means comprising a zoom lens mechanism adjustable to vary simultaneously the magnification of said images of said surface and said reticle.

8. In metrological equipment as defined in claim 7, wherein said beamsplitter is secured on said support with the axial centerline thereof disposed coaxially of said image sensor and said zoom lens mechanism, and said reticle projection system is fixed on said support adjacent said beamsplitter, and is operable to project an image of said reticle onto said beamsplitter along an axis extending at right angles to the axial centerline of said beamsplitter.

9. In metrological equipment as defined in claim 8, wherein said reticle projection system comprises a lens barrel fixed to said support adjacent said beamsplitter, and said reticle is removably mounted in said barrel adjacent one end thereof.

10. In metrological equipment of the type having a video camera, and a reticle projection system for use in autofocusing an image sensor in the camera on a workpiece that is being inspected, apparatus for effecting variable magnification of the reticle image produced by said system, comprising means mounting said camera for adjustment toward and away from a workpiece, and with the image sensor thereof facing the surface of the workpiece that is to be inspected, and optical means including a beamsplitter interposed between said camera and the workpiece, and magnification means operative to project a magnified image of said surface of the workpiece to the image sensor of said camera, said reticle projecting system including a reticle operatively attached to said camera for movement therewith toward and away from the workpiece, and said system being operable to project an image of said reticle to said beamsplitter for projection thereby onto said surface of the workpiece, said optical means being operative, upon projecting an image of said reticle onto said surface of the workpiece, to project the combined images of said surface and said reticle to said image sensor, said reticle projection system and said beamsplitter being mounted between said camera and said magnification means, and said magnification means comprising a zoom lens mechanism adjustable to vary simultaneously the magnification of said images of said surface and said reticle.

11. In metrological equipment as defined in claim 10, wherein said camera mounting means comprises a support mounted for movement toward and away from said workpiece, and said optical means is mounted on said support for movement therewith.

12. In metrological equipment as defined in claim 11, wherein said beamsplitter is secured on said support with the axial centerline thereof disposed coaxially of said image sensor and said zoom lens mechanism, and said reticle projection system is fixed on said support adjacent said beamsplitter, and is operable to project an image of said reticle onto said beamsplitter along an axis extending at right angles to the axial centerline of said beamsplitter.

13. In metrological equipment as defined in claim 12, wherein said reticle projection system comprises a lens barrel fixed to said support adjacent said beamsplitter, and said reticle is removably mounted in said barrel adjacent one end thereof.

* * * * *